Oct. 27, 1970  W. C. KOTHEIMER  3,536,959
MEANS FOR CANCELING SPURIOUS INTERACTION BETWEEN
TWO SPATIALLY PROXIMATE ELECTROMAGNETIC
RELAY UNITS
Filed July 3, 1967  2 Sheets-Sheet 2
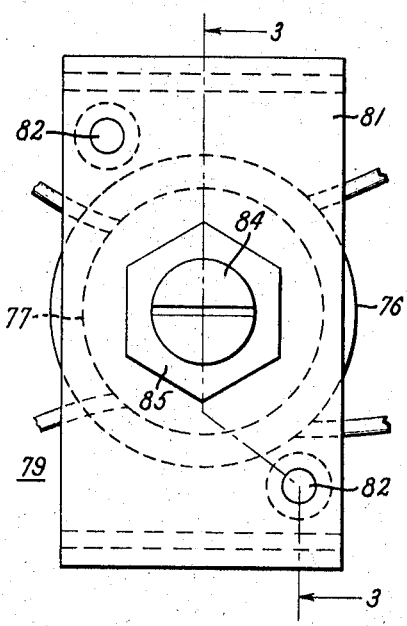
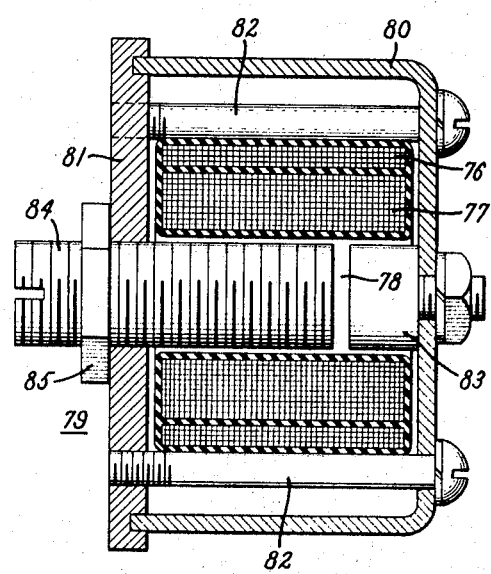
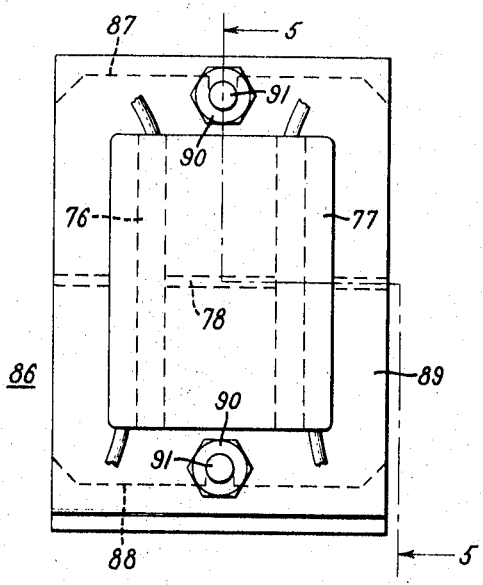
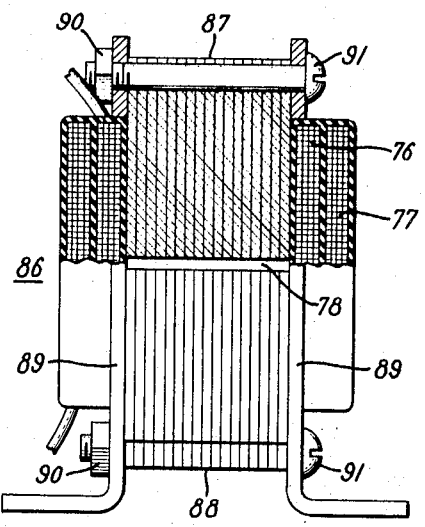
INVENTOR:
WILLIAM C. KOTHEIMER
BY Albert S. Richardson Jr.
ATTORNEY United States Patent Office 3,536,959
Patented Oct. 27, 1970

3,536,959
MEANS FOR CANCELING SPURIOUS INTERACTION BETWEEN TWO SPATIALLY PROXIMATE ELECTROMAGNETIC RELAY UNITS
William C. Kotheimer, Lansdowne, Pa., assignor to General Electric Company, a corporation of New York
Filed July 3, 1967, Ser. No. 650,935
Int. Cl. H01h 9/00
U.S. Cl. 317—58                                     4 Claims

ABSTRACT OF THE DISCLOSURE

The usual circuits provided for energizing separate coils of two adjacent protective relaying units are mutually coupled by compensating means that serves to prevent misoperation of one of the units as a result of stray magnetic flux emanating from the other.

Many schemes for protecting alternating current electric power transmission lines require the cooperative action of two or more separate relays. Thus the transmission line is protected by a "relay" that actually comprises an interconnected set of individual relays or units, each having its own operating characteristic as desired. In practice such cooperating units and associated devices and interconnections are all housed in a common enclosure or relay case. One typical arrangement of this kind, employing electromagnetic distance relay units, is illustrated in a paper written by R. M. Hutchinson, "The Mho Distance Relay," 65 Transactions of the American Institute of Electrical Engineers 353 (June 1946).

Those skilled in the art are familiar with electromagnetic induction units of the "distance" type (more specifically, units having "mho" and "ohm" or "angle-impedance" operating characteristics). Such a unit comprises a movable contact-actuating element (armature) controlled by cooperating magnetic flux-producing coils disposed on a magnetizable frame (stator) of the unit. The coils are variously designated operating, restraint, and polarizing coils. They are respectively energized by input quantities derived from transmission line currents and voltages in such a manner that the associated armature is subjected to an operating torque whenever the relationships between inputs reflect an abnormal or fault condition within the "reach" of that particular unit. Improved designs of this kind of relay are the subject matters of two copending applications Ser. No. 492,484 and Ser. No. 492,548, both filed on Oct. 4, 1965, for Peter Kotos and assigned to the assignee of the present invention now Pats. 3,361,-935 and 3,334,321 respectively.

When two different electromagnetic relay units are physically located in close proximity to each other in a common housing, the operating characteristic of one of the units can be undesirably modified as a result of spurious voltage being induced in its operating coils by stray magnetic flux from the polarizing coils of the companion unit. Accordingly, a general objective of the present invention is to counteract the effect of such undesirable interaction between spatially proximate electromagnetic relay units.

In carrying out my invention in one form, any tendency for stray flux from a coil of a first relay unit to induce spurious voltage in an adjacent coil of the second relay unit is neutralized by interconnecting the respective energizing circuits for these coils so that the later coil has imparted thereto a compensating voltage substantially equal in magnitude and opposite in polarity to said spurious voltage.

The invention will be better understood and its various objects and advantages will be more fully appreciated from the following description taken in conjunction with the accompanying drawings in which:

FIG. 2 is an elevational view of a compensator used in the FIG. 1 relay to practice my invention in one form;

FIG. 3 is a sectional view taken along lines 3—3 of FIG. 2;

FIG. 4 is an elevational view of another compensator that can be used in lieu of the one shown in FIG. 2; and FIG. 5 is a partial sectional view through lines 5—5 of FIG. 4.

Figure 1:
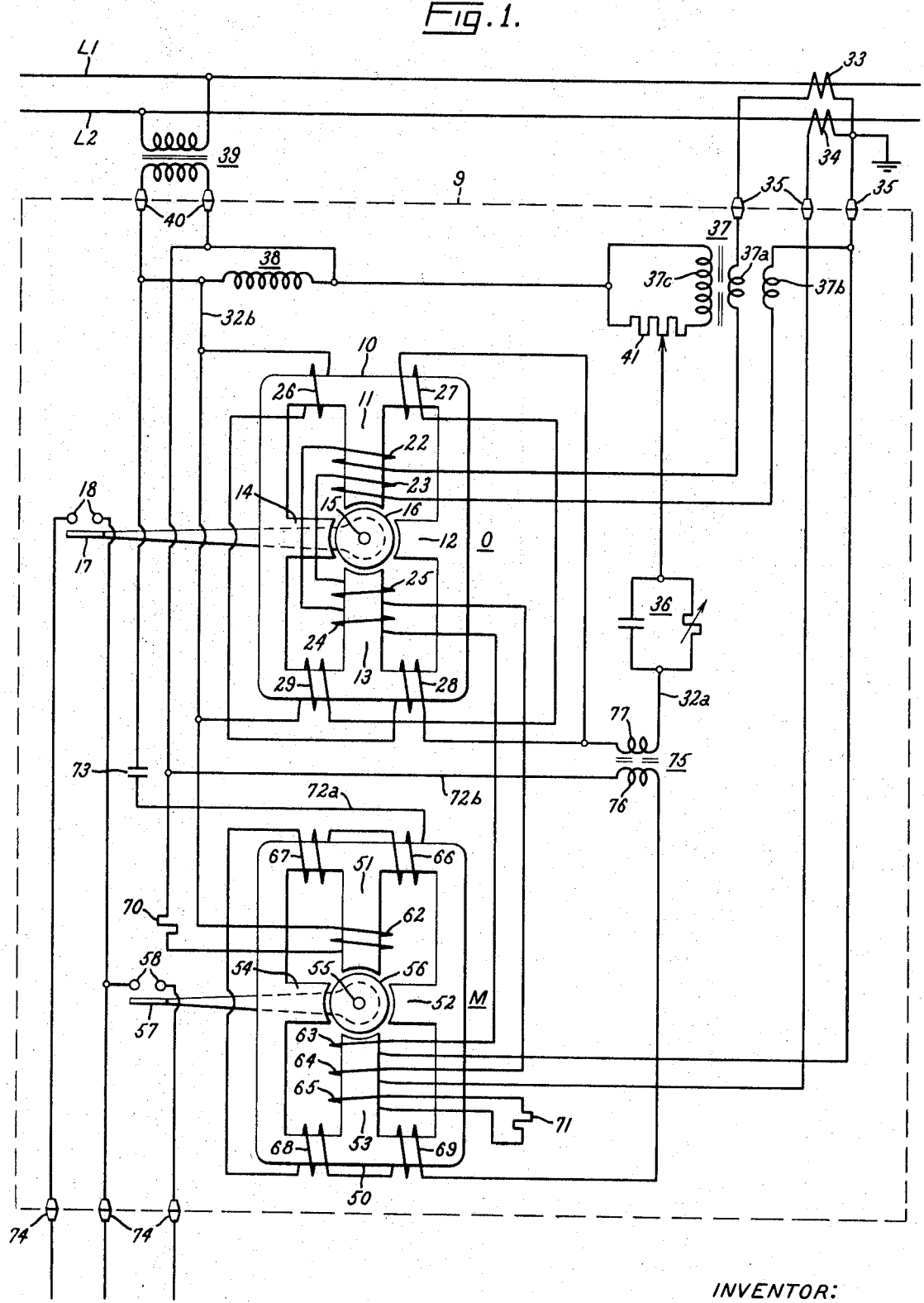
FIG. 1 is a schematic diagram of a preferred embodiment of the invention.

FIG. 1 depicts a protective relay comprising distance relay units O and M in a common enclosure 9. Preferably the upper unit O comprises a frame structure or stator 10 constructed of laminated magnetizable material and having four symmetrically disposed salient poles 11, 12, 13, and 14. The body of stator 10 forms a closed magnetic path or loop which is effectively divided into four consecutive parts or quadrants by the four salient poles. The poles project from the stator body toward a centrally located axis 15 and terminate in inwardly disposed concave pole faces.

A magnetizable member or core (not shown) is located intermediate the salient poles 11–14 and is spaced apart from their extremities to define therewith four gaps which are symmetrically located with respect to the axis 15. The core is a cylindrically shaped member physically annexed to the stator and provides a common link in the complete magnetic circuit for magnetic flux issuing from the extremities of the respective poles.

An electroconductive armature or rotor 16 is mounted pivotally on axis 15 for rotation through the gaps formed by the core and the faces of the four stator poles 11–14. A portion of the surface of this current conducting induction element 16, which preferably is a lightweight, cup-shaped, member, extends into these gaps for movement in a direction generally parallel to the pole faces, and thus the current conducting path provided by the rotor lies substantially transverse to the magnetic fields between the core and the respective pole faces. The element 16 is actuatable in either direction by driving torque created by the interaction of the magnetic fields in the element. Rotation of the element in a clockwise direction, as illustrated in FIG. 1, carries a movable switch contact 17 into bridging engagement with cooperating stationary contacts 18 thereby to perform a circuit controlling operation.

The mechanical structure of the relatively compact stator and rotor described thus far is well known in the art. If desired, the improvements that are in subject matter of the previously mentioned copending patent application Ser. No. 492,548–Kotos can be used. It should be clearly understood, however, that the present invention is not limited by the use of this particular relay construction.

As can be seen in FIG. 1, various electrical coils or windings are disposed on the stator 10. Four coils 22–25 having equal turns are located in pairs on the non-adjacent stator poles 11 and 13, respectively. Another four coils 26–29 having equal turns are respectively located on the four quadrants of the stator body. The operating characteristic of the relay unit O depends on the source of the input quantities that are selected to energize the respective coils 22–29. By way of example, it is assumed that this particular unit is to operate with the characteristic of a 90-degree-angle-impedance or reactance relay, and toward this end its coils are arranged and energized in the improved manner taught by Kotos in the previously mentioned copending patent application Ser. No. 492,484.

Accordingly, the coils 22 and 24 have been serially connected to the secondary winding of an external current transformer 33 associated with a primary A-C conductor L1, while the coils 23 and 25 have been serially connected to the secondary winding of another current transformer 34 associated with a parallel A-C conductor L2. The conductors L1 and L2 represent two wires of a 3-phase, 3-wire, alternating-current electric power transmission line. The current transformers 33 and 34 derive secondary currents proportional to the currents in the protected line and, via suitable bushings 35 in a wall of the relay enclosure 9, supply these quantities to the unit coils 22, 24, and 23, 25, respectively. When thus energized the coils 22–25 produce in the associated poles 11 and 13 a net magnetic flux proportional to the difference or phase current I being conducted by the protected line. This flux serves a polarizing purpose.

As is shown in FIG. 1, the remaining coils 26–29 of the unit O have been connected between two leads 32a and 32b comprising circuit means for supplying these coils with their energizing quantity. The circuit means also includes a parallel R-C circuit 36, a secondary winding 37c of a transactor 37, and an internal autotransformer 38 coupled to the primary A-C conductors L1 and L2 by means of an external potential transformer 39. The transformer 39 derives a secondary voltage proportional to the phase voltage E between the conductors L1 and L2 of the protected line, and this voltage is supplied to the relay components within the enclosure 9 via suitable wall bushings 40.

The transactor 37 is a well known device having electrical characteristics similar in some respects to a conventional transformer and similar in other respects to a reactor. It comprises in effect an air-gap reactor having associated therewith two primary windings 37a and 37b and a secondary winding 37c. A potentiometer 41 is shown connected across the secondary winding 37c. The voltage developed across the tapped portion of the potentiometer 41 is therefore representative, both in magnitude and phase, of the net A-C current flowing in the windings 37a and 37b. This voltage is related to net primary current by a complex proportionality constant or vector operator $Z_T$ known as the transfer impedance of the transactor. The transactor primary winding 37a is included in the secondary circuit of the current transformer 33, and the companion primary winding 37b is connected with opposite polarity in the secondary circuit of current transformer 34, whereby the net primary current is proportional to the transmission line current I. Consequently, the voltage obtained from potentiometer 41 is proportional to $IZ_T$, and the coil leads 32a and 32b are energized in accordance with the complex quantity $IZ_T - E$. In this quantity, $IZ_T$ serves an operating purpose and E serves a restraint purpose.

When thus energized the relay coils 26–29 produce in the side poles 12 and 14 of the stator 10 a proportional magnetic flux. This flux together with that produced by the current-energized polarizing coils 22–25 establish magnetic fields in the gaps defined by the extremities of the four poles 11–14 of the stator 10. In a manner well known to those skilled in the art, the magnetic fields interact in the movable element 16 to create a driving torque for actuating this contact carrying element. The total torque acting on the element 16 is the sum of the torque components contributed by the interaction of the magnetic fields in adjacent pairs of gaps, which components are respectively proportional to the product of the ampere-turns of the coils producing the involved fields. Whenever the resultant or net driving torque is in a clockwise direction, the relay unit O operates to close its contacts 17, 18, and whenever the net driving torque is counterclockwise, no operation is obtained. The condition of zero torque, therefore, defines the operating limits of the unit.

The following equation describes the operating characteristics of the unit O shown in FIG. 1: $Z \sin \theta = X_F$, where Z is the apparent impedance of the transmission line as seen by the relay (i.e., the ratio of transmission line voltage E to transmission line current I as reflected by the potential and current transformers), $\theta$ is the phase angle between E and I (i.e., the power factor angle), and $X_F$ is the preset ohmic reach of the unit. Whenever the reactance of the transmission line becomes less than $X_F$, which is equal to $Z_T \sin \phi_1$ ($\phi_1$ being the angle by which $IZ_T$ leads I), the net driving torque of the contact carrying element 16 is clockwise and the unit will operate.

Preferably the companion relay unit M comprises a magnetizable stator 50 having four salient poles 51, 52, 53, and 54 symmetrically disposed with respect to a central axis 55. A cooperating core (not shown) is located intermediate the salient poles 51–54 and is spaced apart from their extremities to define therewith four gaps through which an electroconductive rotor 56 can move. The latter element is mounted pivotally on axis 55, and its rotation in a clockwise direction carries a movable switch contact 57 into bridging engagement with a pair of stationary contacts 58 thereby to perform a circuit controlling function. The mechanical structure of the unit M described thus far is essentially the same as that of the previously described unit O.

As can be seen in FIG. 1, various electrical coils are disposed on the stator 50 of the relay unit M. One coil 62 is located on the stator pole 51, and three other coils 63–65 are disposed on the opposite pole 53. A pair of coils 66 and 67 having equal turns are respectively located on the two quadrants of the stator body that are divided by the pole 51, and another pair of coils 68 and 69 are respectively located on the remaining quadrants. For the sake of illustration, it is assumed that the unit M is to operate with the characteristic of a mho relay, and toward this end its respective coils 62–69 are arranged and energized in the manner that will now be explained.

The coil 62 is connected by way of a resistor 70 to the secondary winding of the potential transformer 39 for energization by a percentage of the phase voltage E. When thus energized the coil 62 produces in the pole 51 a proportional magnetic flux which serves a restraint purpose.

The coils 63 and 64 are respectively connected in series with the secondary windings of the external current transformers 33 and 34, whereby they produce in the pole 53 of relay M a net magnetic flux proportional to the phase current I being conducted by the protected transmission line. This flux serves an operating purpose.

The third coil 65 on the pole 53 is a shading coil which is shunted by a resistor 71 of selected magnitude.

As is shown in FIG. 1, the remaining coils 66–69 of the relay unit M had been connected between two leads 72a and 72b comprising circuit means for supplying these coils with their energizing quantity. The circuit means also includes a memory capacitor 73 and the secondary winding of the potential transformer 39. Thus the coil leads 72a and 72b are energized in accordance with the transmission line voltage E, and the coils 66–69 produce polarizing flux in the side poles 52 and 54 of the stator 50.

Magnetic fields are established in the gaps at the extremities of the four poles 51–54 of the unit M by the fluxes issuing therefrom, and these fields interact in the movable element 56 to create a driving torque for actuating this contact carrying element. Whenever the resultant or net driving torque is in a clockwise direction, the unit M operates to close its contacts 57, 58. The following equation describes the operating characteristics of this unit: $1/Z \cos(\theta - \phi_2) = K$, where $\phi_2$ is the angle of maximum torque of the unit and K is a predetermined design constant.

As is shown in FIG. 1, the contacts 18 and 58 of the respective units O and M that comprise the illustrated relay are made externally accessible by way of suitable bushings 74 in a wall of the common enclosure, whereby these contacts can be utilized in conventional control and protective circuits as desired. In practice, the two units O and M are physically located in close proximity to each other within a compact housing. Ordinarily these units are disposed at different elevations in the housing, and the housing, which may be made of magnetizable material such as steel, is so mounted that the axes 15 and 55 of both units are vertical. Consequently, at least one of the operating coils 26–29 of the unit O will be directly above a polarizing coil on the stator of unit M. As a result, enough stray or leakage flux emanating from a polarizing coil of the unit M (e.g., coil 69) can reach a separate coil of the companion unit O (e.g., coil 29) to induce therein a spurious voltage which, under certain conditions, has sufficient strength to cause misoperation of the latter unit. This leakage flux passes directly through the air space between units O and M and also indirectly via a path comprising a partially the metal walls at the enclosure 9 and partially air space. It has been determined by testing one particular embodiment of the illustrated relay that approximately 1% of the voltage applied to the coils 66–69 of unit M is induced in the coils 26–29 of unit O. Such an induced voltage will cause the operating characteristic of the latter unit to droop excessively at relatively low magnitudes of fault current in the protected transmission line.

In accordance with my invention, the above-identified problem is cured by adding compensating means 75 to the relay. As is shown in FIG. 1, the compensator 75 comprises a pair of magnetically coupled inductors 76 and 77 conductively connected in the energizing circuit for the coils 66–69 of relay unit M and in the energizing circuit for the coils 26–29 of relay unit O, respectively. Preferably the inductors 76 and 77 are primary and secondary windings of a transactor. The primary winding 76 is connected in series with the coils 66–69, whereby it is supplied with the same quantity that energizes these coils of unit M. The secondary winding 77 is connected between lead 32a and the coils 26–29, whereby its voltage adds to or subtracts from the voltage between the leads 32a and 32b that energizes these coils of unit O.

The function of the compensator 75 is to neutralize the effect in the unit O of stray magnetic flux from unit M. It accomplishes this function by interposing in the energizing circuit of the affected coils 26–29 of the former unit a compensating voltage proportional to the A-C quantity that is energizing the interacting coils 66–69 of the latter unit. The magnetic structure of 75 is so designed and the turns ratio of its windings 76 and 77 is so selected that the compensating voltage that the winding 77 imparts to the coils 26–29 will be just equal in magnitude to the spurious voltage induced by stray flux from the coils 66–69. By appropriately poling the secondary winding 77, its compensating voltage is made exactly opposite in polarity to the spurious voltage. The equal magnitude but 180-degree out-of-phase relationship between compensating voltage and spurious voltage is inherently maintained for any variation in the latter, since both voltages are generated by the same electric quantity. Consequently, the compensating voltage always cancels out or negates the spurious voltage in coils 26–29, and proper operation of the unit O is ensured.

Two practical designs of the magnetic structure of the compensator 75 have been shown in FIGS. 2 and 4. In both cases the primary and secondary windings 76 and 77 are disposed on a frame structure constructed of magnetizable material having an air gap 78. In one case the length of the air gap is readily adjustable, in the other it is not.

As can be seen in FIGS. 2–3, the frame structure 79 of the compensator comprises a U-shaped member 80 clamped to a flat base 81 by a pair of long bolts 82. A short pole piece 83 is fastened to the member 80 as shown, and coaxially therewith a cylindrical core 84 is threaded into the base. The core 84 is embraced by the primary and secondary windings 76 and 77, the latter having substantially more turns than the former. By first loosening a lock nut 85, the core 84 can be further inserted or withdrawn to adjust the length of the air gap 78 between it and the pole piece 83 as desired.

The frame structure 86 of the compensator shown in FIGS. 4–5 comprises two facing sets of E-shaped laminations 87 and 88 disposed between upright brackets 89 which in turn are fastened together by a pair of nuts and bolts 90 and 91. The opposing ends of all three legs of the respective lamination sets 87 and 88 are separated from each other by a short distance as shown. The center legs are embraced by the primary and secondary windings which in this case have substantially equal turns.

While I have shown and described a preferred form of my invention by way of illustration, various modifications and refinements will occur to those skilled in the art. It should be understood that the usefulness of my invention is not limited to the particular external circuit connections to the relay coils that have been shown for purposes of illustration. I contemplate by the claims which conclude this specification to cover all modifications that fall within the true spirit and scope of my invention.

What I claim as new and desire to secure by Letters Patent of the United States is:

1. In combination with first and second spatially proximate electromagnetic relay units each of which is equipped with a movable element controlled by cooperating magnetic flux-producing coils respectively adapted to be energized by given alternating electric quantities, said relay units being so constructed and arranged that spurious voltage is induced in at least one coil of said first unit by stray magnetic flux from a separate coil of said second unit:
   (a) first circuit means for supplying alternating current to said one coil of said first unit;
   (b) second circuit means for supplying alternating current to said separate coil of said second unit; and
   (c) means connected with said second circuit means to be energized by the current therein and coupled to said first circuit means for interposing in said first circuit means a compensating voltage proportional to the current energizing said separate coil, thereby neutralizing the effect of said stray magnetic flux in said one coil.

2. In combination with first and second electromagnetic relays each having a movable element and a plurality of coils that are intended to produce magnetic flux for actuating said element when energized by given electric quantities, said relays being housed in a common enclosure in such close proximity to each other that a spurious voltage is induced in at least one coil of said first relay by stray magnetic flux from a separate coil of said second relay:
   (a) first circuit means for supplying said one coil of said first relay with its energizing quantity;
   (b) second circuit means for supplying said separate coil of said second relay with its energizing quantity; and
   (c) coupling means connected with said second circuit means to be energized by the energizing quantity thereof, and coupled to said first circuit means for imparting to said one coil a compensating voltage substantially equal in magnitude and opposite in polarity to said spurious voltage.

3. The combination of claim 2 in which said coupling means comprises in series with said second circuit means a primary winding magnetically coupled to a secondary winding connected in series with said first circuit means.

4. The combination of claim 3 in which said primary and secondary windings are disposed on a magnetizable frame having an air gap.

References Cited

UNITED STATES PATENTS 2,466,629 4/1949 Weaver _____ 307—90
3,285,165 11/1966 Richter _____ 307—90 X LEE T. HIX, Primary Examiner U.S. Cl X.R.
307—90; 335—7, 177